3,339,603
TOMATO PEELING MACHINE
Franco Dall'Argine and Ermes Ghiretti, both of Strada Mercato 81b, Cornocchio-Parma, Italy
Filed Dec. 12, 1963, Ser. No. 330,090
5 Claims. (Cl. 146—47)

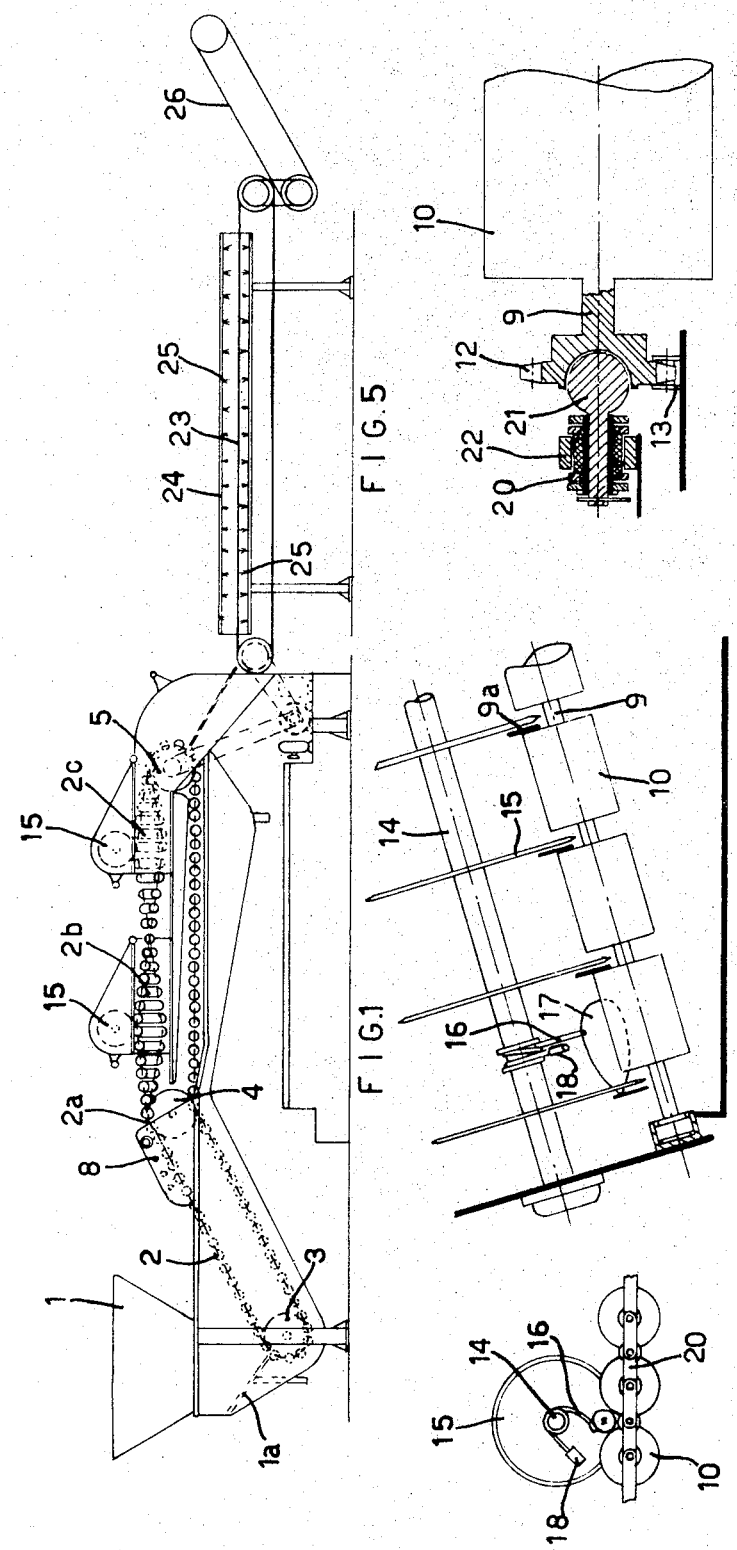

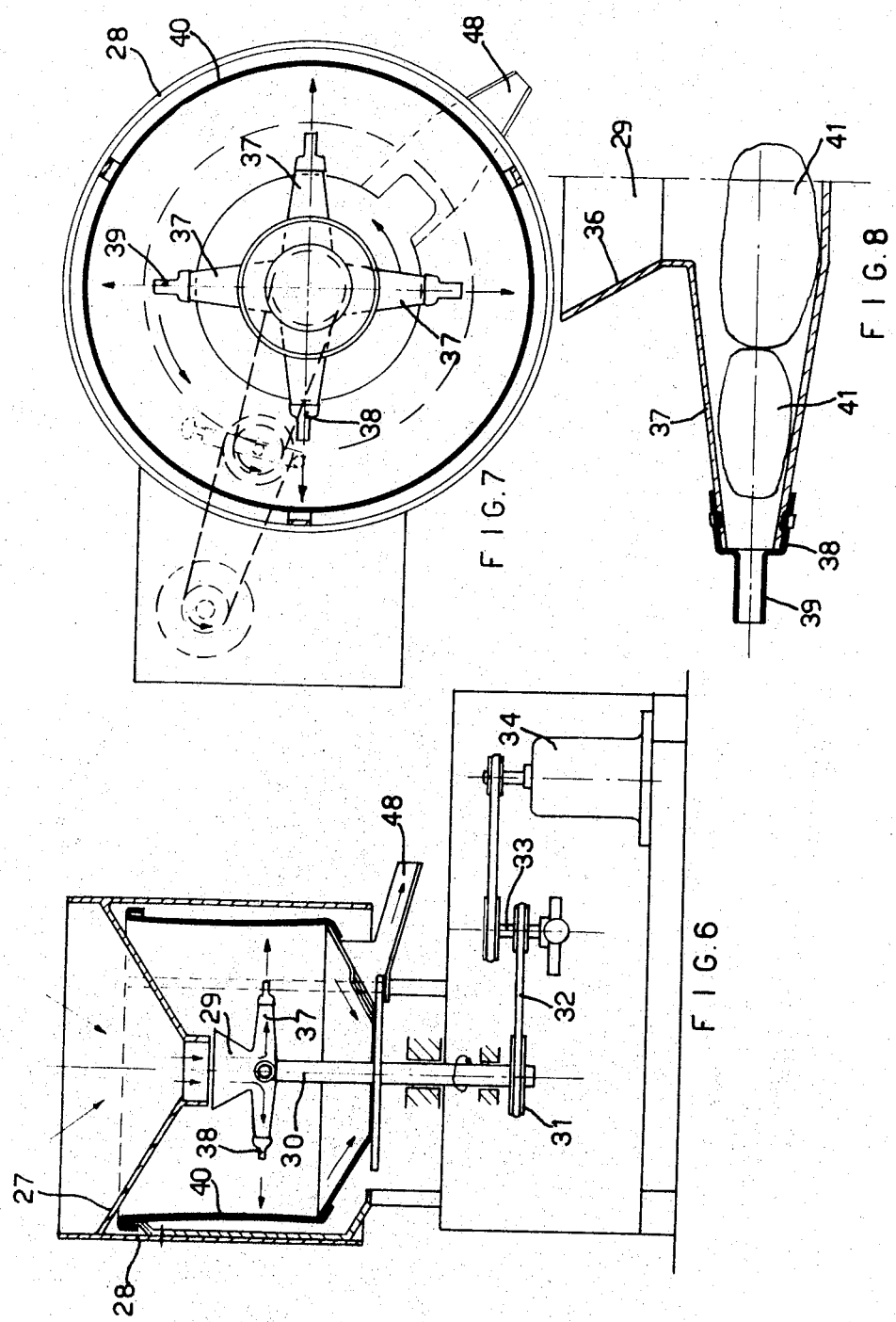

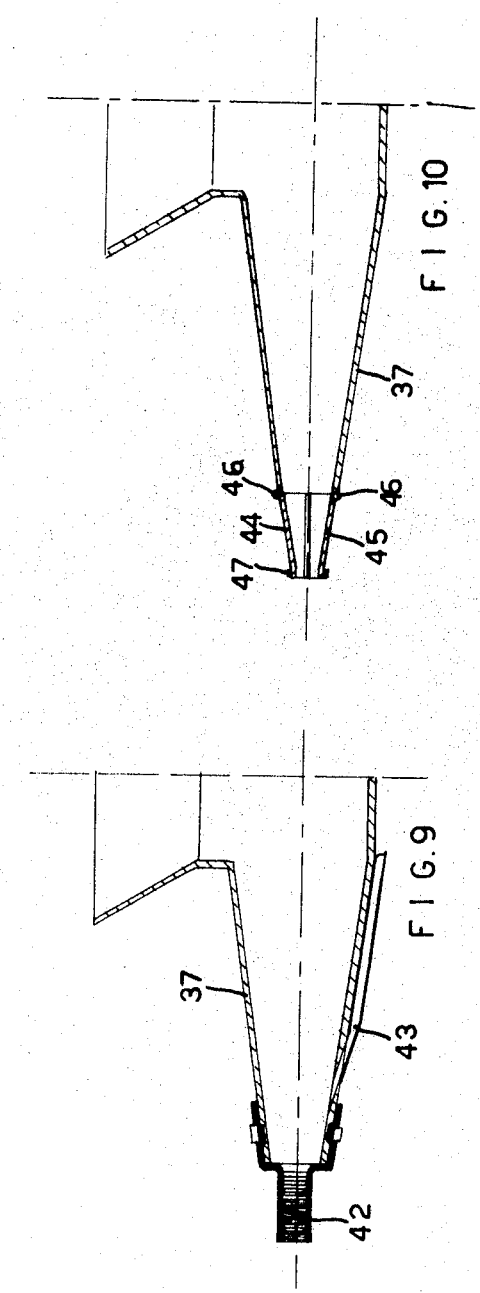
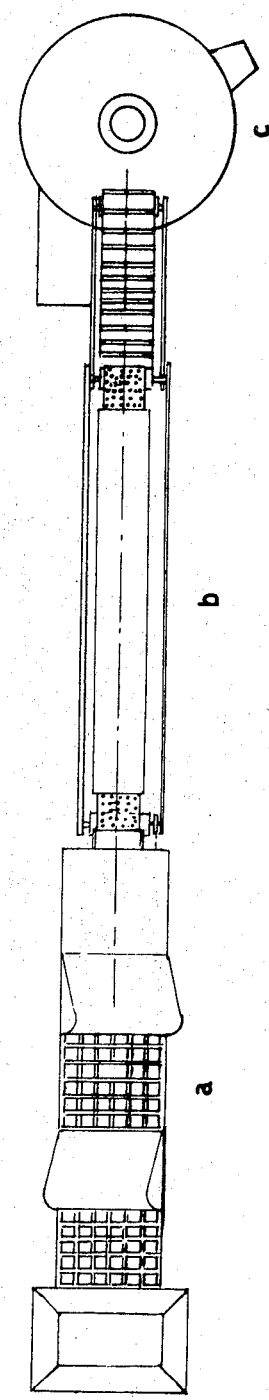

This invention relates to apparatus for peeling special egg-shaped tomatoes of the shape called San Marzano, in the course of which said tomatoes undergo three successive treatments, namely: (a) trimming, (b) scalding, and (c) peeling.

Trimming is performed on the raw tomatoes through a mechanical set of revolving knives which cut the end of the tomatoes off, thus transforming each tomato into a cylinder with flat ends.

Scalding is performed by traditional scalding machinery adapted to envelop the trimmed tomatoes passing by on the conveyor belt with steam jets.

No particular claim is lodged by the inventors to this scalding operation since it can be performed according to many and different methods. It is only mentioned as a necessary manufacturing step in the treatment of the tomatoes.

Peeling is performed by a mechanism which separates the peel from the pulp by centrifugal force.

Although this invention refers to the complete process of peeling tomatoes, the patent aim is to specially protect the trimming and the peeling units.

The trimming unit comprises a conveyor belt of rollers duly supported and running around two belt drums, driven by means of a couple of pull chains.

Such a conveyor belt consists of a plurality of bearing axles each of them being inserted in one or more rollers (in the present example four).

Each roller turns around its axle at about a centimeter's distance from the next one, owing to the fact that said axle carries at its ends two toothed wheels engaging an open link chain stretched between the feeding roller and the return roller. While on the climbing and horizontal portion of their path of travel the rollers stay horizontal, but they take on a sloped position first in one direction and then in another, in the undulating portion of the chain, owing to the fact that the two side pull chains run during this portion on relatively staggered rails, that is: while a portion of one rail is represented by a cavity the opposite one is represented by a convexity and the same is to be said for the next portion.

The inclination of said rolling axles is permitted by ball-and-socket joints connected with the pull chains and this is one of the novel features of this trimming unit.

Along all the sinusoidal path just mentioned, there are, between the spaces of the rollers and keyed on the axles a plurality of vertical plates fixed to the machine in order to create guide channels.

Above the previously mentioned belt of rollers there are two shafts mounted on the machine frame and axially rotating on ball bearings each one of which carries as many knives as there are the rollers on each shaft.

Such shafts are parallel to the deepest inclination of the rolling axles and thus the plates are consequently in a perpendicular position with respect to the same shafts and their cutting edges graze the rollers.

On the same sinusoidal path the machine carries on its top portion many rods, placed in a horizontal position with respect to the different inclinations of the roller; each rod carries a set of spirally disposed bars arranged crosswise to the rollers, having one end weighted with a balance weight while the other end clears the rollers of the conveyor belt by a distance which is shorter than the diameter of the tomato. These bars supplied with a balancing weight hold the tomatoes fast during the cutting operation.

Trimming is performed as follows:

The tomato comes down from a feeding hopper mounted before and above the conveyor rollers, travels downwardly on it, is brought upwards and is washed by water spouts.

Along said path each tomato finds automatically its position between the rollers in a parallel direction. All tomatoes which do not find it fall down on an inclined plane which brings them back on the conveyor rollers.

Beyond the summit of the upwards path begins the inclination of the rollers spaced by the metallic guides, according to the previously arranged intervals. The tomatoes will have a tendency to move by gravity along the roller axles until stopped by the guide walls. They then come into contact with the rotating plates, and are cut all on the same end. Subsequently they will slide to the opposite side, the inclination of the rolling belt is reversed and get cut down on the other end.

The conveyor belt then follows a horizontal path and at last it unloads the trimmed tomatoes into the scalding unit. The trimmed ends falls on a gatherer below and are ejected by traditional means.

To be clear we are illustrating the trimming unit in the figures annexed to this application which represents our preferred embodiment, in which:

FIG. 1 shows the trimming unit in its vertical longitudinal section as a whole and connected with the feed chain;

FIG. 2 shows the roller sections with the tomato blocking forks before the cutting operation, and FIG. 3 shows the longitudinal section of the connection which joins the roller shafts with the pull chain.

The following should be noticed: the hopper 1 with its inclined plane 1a which leads to the conveyor belt of rollers 2 going around the two drums 3, 4, the spraying means 8 at the upper end of the climbing path 2a, as well as the higher part of the belt with the portions 2b and 2c inclined in the opposite directions.

Further to be noticed are: the return drum 5 of said conveyor belt consisting of the shafts 9 which bear the rollers 10 so spaced one from the other to admit along the undulating portion of the path of travel the metallic plates 9a against which the tomatoes stop first with one end and then with the other as a result of the inclination of the rollers transporting them.

It is also to be noted that the rods 14 around which are disposed the bars 16 with the balance weight 18 are crested to stop the tomatoes while they are being cut by the knives 15 trimming them on both ends.

FIG. 4 particularly shows the roller 10 on shaft 9 of the belt, which bears at its end the toothed wheel 12 engaging the fixed chain 13 and connecting through the elbow joint 21 the pull chain 22, the single shafts of the roller belt being linked together by the small plates 20.

The scalding unit is schematically shown in FIG. 5 and consists of a perforated sheet 23 running under a tunnel on which the tomatoes already trimmed and falling from the roller belt 2 beyond the return drum 5 fall and are enveloped during their passage by steam jets from each side.

At the end of each path an elevator 26 conveys the tomatoes and then unloads them into the feed hopper of the peeling unit.

The peeling unit which belongs to the apparatus for the production of peeled tomatoes—which is the object of this application—and separates the tomato peel from the pulp by means of centrifugal force, leaving thus a tomato which retain all its original shape.

As a matter of fact the peeling unit consists of a cylindrical container fed from a hopper which brings the tomatoes to it and rotates them around a central journal. The peripheral wall of this container is provided with a plurality of outwardly projecting spouts. The spouts have a tapered entrance portion as have the elastic sleeves at the end of them.

Owing to the centrifugal force the scalded and trimmed tomatoes are projected outwardly from the container through said spouts and go through the elastic tapered ends which are of a smaller section than the tomatoes. They undergo an axial thrust which matching with the annular pressure of the sleeves, causes the pulp to be extruded while the peel separates.

In order to prevent the peeled tomatoes from becoming mashed against the container wall a rubber sheet is placed between the wall itself and the rotating expeller, simply hanging to protect the tomato from shock. An underlying channel, joined to the inclined bottom of the container, conveys all the peeled tomatoes and peels outside the unit, on a common separator.

The elastic truncated-cone-shaped sleeves which cause the peel to be separated from the pulp have according to this invention a knurled surface, since they show a tendency to become slippery when wet by the juice of the tomatoes.

According to another embodiment of this invention the sleeves are always kept dry by an air jet blowing inside, and are fitted to help the peels to stick to them. It is also possible to make such sleeves consisting of two parts connected together by a hinge along their longitudinal axis which enables these parts to successively separate one from the other and to come in touch again by the help of an elastic ring mounted on the sleeve.

The features of this peeling unit will be better understood when referring to the enclosed drawings which represent one of the possible embodiments of the invention, only given as an example and not as a limit of it.

FIG. 6 shows a vertical intermediate section of the peeling portion of which FIG. 7 is a top view and FIG. 8 is the detail of the expeller spout;

FIG. 9 shows a sleeve with knurled inside surface and with the air jet;

FIG. 10 shows another type of sleeve made out of metal.

From the elevator 26 the tomatoes fall into the hopper 27, which is inserted inside the cylindrical fixed container 28 with flat bottom 35, and go into the expeller 29. This consists of a cylindrical or circular box fastened to a shaft head 30 at the lower end of which is annexed a pulley 31 with transmission 32 to the reduction gearing 33 and to the motor 34. These last items, must be in a position to impart to the shaft 30, and therefore to the box 29, adjustable axial rotation.

The bottom 36 of the box 29 is inclined and connected with a suitable number of radial spouts through which the tomatoes are to be projected. At the end of these spouts is the joint 38 connecting said spouts to the sleeves 39.

The hanging anti-shock rubber mat 40 and may be seen in FIGURE 6, together with the trimmed tomatoes 41 (FIG. 8), which are shown being projected along the pipe 37 toward the discharge pipe.

In FIG. 9 are to be seen the wall of the sleeve with knurled surface and air jet pipe 43 fed by a ventilator and a compressor not shown here.

Finally FIG. 10 shows a metallic sleeve with its two walls 44, 45 the hinge 46 and the elastic lip 47.

Under the hopper where the tomatoes fall down, the rotating box has a helically curved iron sheet to convey the tomatoes. To comply with the desired production amount the diameter of the rotating box and the number of the expelling spouts might be increased, as well as the number of many other parts of the machine included in the moving, feeding and transporting engines, without going out of the limits of this invention.

FIG. 11 schematically shows the apparatus for the peeled tomato production where: (a) is the trimming unit; (b) is the scalding unit and (c) is the peeling unit.

We claim:
1. A machine for removing the peel from an object having a central pulp surrounded by said peel, said machine comprising means for slicing a section of peel from diametrically opposed portions of the surface of said object, means for scalding said object, a resilient sleeve having at least one transverse dimension less than the corresponding dimension of said object, a passageway through which said object is led to said sleeve, the diameter of said passageway diminishing as its approaches said sleeve, and means for projecting said scalded object into one end of said sleeve with sufficient momentum to carry said pulp completely through said sleeve and out the other end while said peel is frictionally arrested by the inner surface of said sleeve, said projecting means comprising a receptacle connected to receive scalded objects from said scalding means and from which a plurality of said passageways project radially outward, with each passageway terminating in a sleeve, together with means for rotating said receptacle passageways and sleeves as a unit so that a scalded object delivered to said receptacle is projected through one of said passageways into one of said sleeves by centrifugal force.

2. A machine as defined in claim 1 comprising means for directing a current of air against the inner surfaces of said sleeves.

3. A machine for removing the peel from an object having a central pulp surrounded by said peel, said machine comprising means for slicing a section of peel from diametrically opposed portions of the surface of said object, means for scalding said object, a resilient sleeve having at least one transverse dimension less than the corresponding dimension of said object, said sleeve being made of separate sections divided longitudinally of said sleeve and biased together by resilient means, and means for projecting said scalded object into one end of said sleeve with sufficient momentum to carry said pulp completely through said sleeve and out the other end while said peel is frictionally arrested by the inner surface of said sleeve.

4. A machine for removing the remaining peel from scalded objects having a central pulp surrounded by said peel after portions of said peel have been sliced from two diametrically opposed areas on the surfaces of said objects, said machine comprising a resilient sleeve having a normal transverse dimension less than the corresponding dimension of said objects and means for projecting said objects into one end of said sleeve with sufficient momentum to carry said pulp completely through said sleeve and out its other end, while said peel is frictionally arrested by the inner surface of said sleeve and thereby separated from said pulp, said projecting means comprises a receptacle for receiving said objects and from which a plurality of resilient sleeves project, together with means for rotating said receptacle so that said objects are projected into said sleeves by centrifugal force.

5. A machine as set forth in claim 4 in which the slicing means for slicing portions of said peel comprise first and second sets of substantially parallel knives, conveyor means mounted to travel beneath said knives in a direction parallel to the planes of said knives, the uppermost side of said conveyor means defining recesses for receiving the lower portions of said objects, means for driving said conveyor means to draw said objects past said knives, said conveyor means being tilted transversely with respect to its path of travel in one direction as it passes beneath one set of knives and in the opposite direction as it passes between the second set of knives so as to slide opposite sides of said objects toward said knives, and guide means in front of said knives for preventing more than the tips of said objects from sliding transversely past said knives.

References Cited

UNITED STATES PATENTS

| | | | |
|---|---|---|---|
| 1,098,398 | 6/1914 | Phinney | 146—86 |
| 1,179,437 | 4/1916 | Knapp | 146—84 |
| 1,377,465 | 5/1921 | Cox | 146—81 X |
| 1,976,710 | 10/1934 | Carpentieri | 146—47 X |
| 2,616,819 | 11/1952 | Ford | 146—225 |
| 2,910,392 | 10/1959 | Magnuson | 146—47 X |
| 3,192,977 | 7/1965 | Bean | 146—241 |

OTHER REFERENCES

A.P.C. application of Messinese, Ser. No. 359,123, pub. May 18, 1943.

WILLIAM W. DYER, JR., *Primary Examiner.*

W. GRAYDON ABERCROMBLE, ANDREW R. JUHASZ, J. SPENCER OVERHOLSTER, *Examiners.*